Jan. 21, 1958 B. SCHLOSS 2,820,905
RADIATION DETECTOR CALIBRATION
Filed June 3, 1954
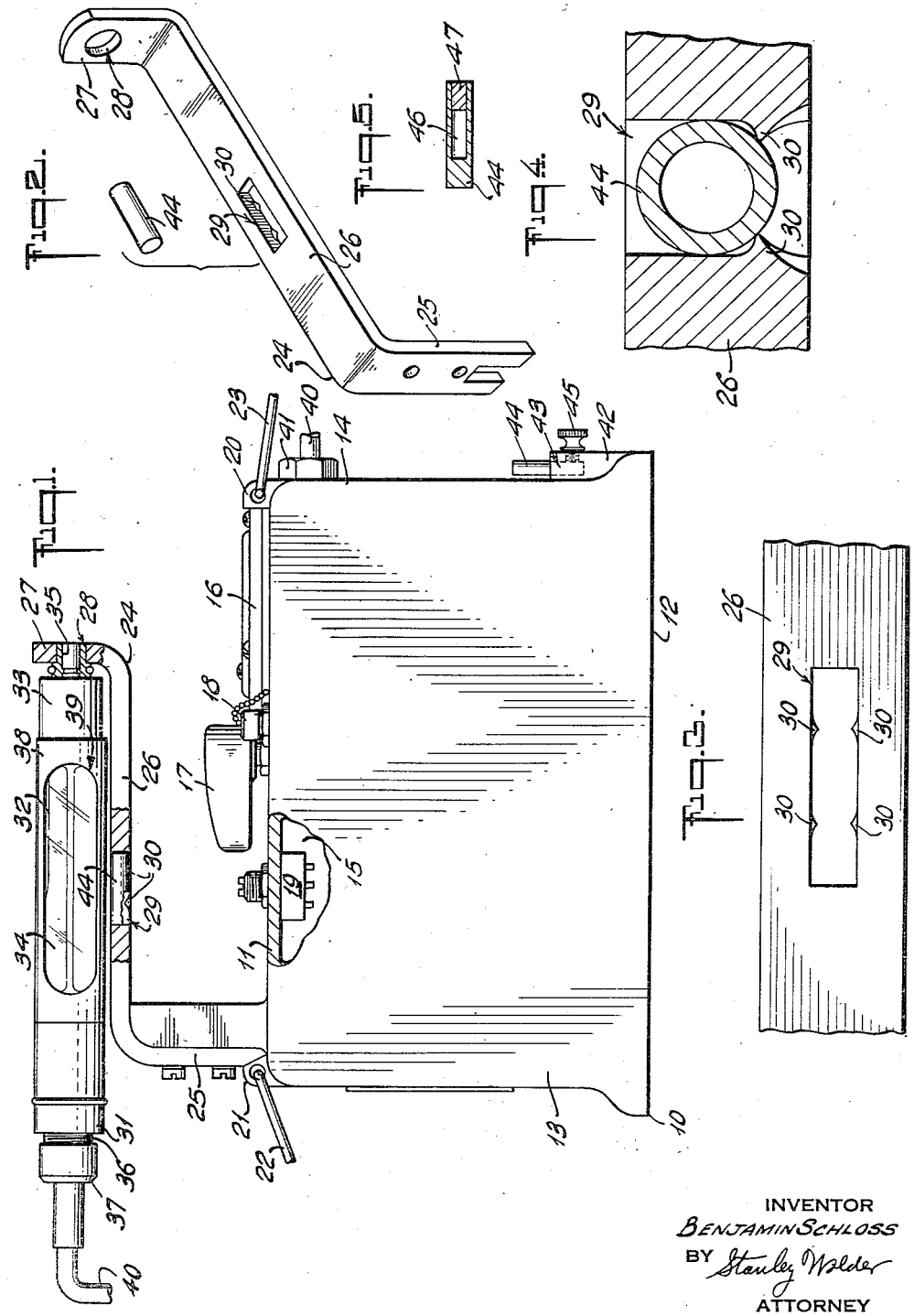
INVENTOR
BENJAMIN SCHLOSS
BY Stanley Walder
ATTORNEY

United States Patent Office 2,820,905
Patented Jan. 21, 1958

2,820,905

RADIATION DETECTOR CALIBRATION

Benjamin Schloss, Brooklyn, N. Y.

Application June 3, 1954, Serial No. 434,269

5 Claims. (Cl. 250—83.6)

The present invention relates to a novel method and means for calibrating instruments which detect and also those which measure radiation. Typically, it may be employed with Geiger counters and scintillation detectors.

Presently radiation detectors are commonly checked by means tantamount to laboratory procedures. What is needed is a simple means and method of quickly establishing the appropriate operating conditions for such instruments. This is especially true of portable devices.

An object of the present invention is to provide an extremely simple yet accurate and rapid means and method of calibrating a radiation detector.

Another object thereof is the provision of a radiation standard and cooperating means to enable the ready calibration of radiation sensing devices.

Still another object thereof is the provision of a calibration procedure for radiation detectors and means for following the same particularly applicable to portable instruments.

These and other purposes are achieved in the preferred embodiment of the invention for use with a Geiger counter including a probe assembly mountable on a handle attached to the case or housing of the instrument by providing a calibrating capsule which contains a radiation source of predetermined intensity, i. e. a solution of radium bromide, and placing the same in a slot in said handle in position to confront a sensitive portion of said Geiger tube when it is fixed thereover, the visual indication means of said instrument, i. e. a microammeter, bearing a calibration marker so that the operator may adjust a gain circuit in the instrument to cause the reading taken with said capsule to coincide with said marker. Means may also be provided to house said capsule in another part of said case out of communication with said tube when the calibration procedure is completed.

Other objects and a fuller understanding of the present invention may be had by referring to the following detailed description and claims, taken in conjunction with the accompanying drawing which illustrates a preferred embodiment thereof, it being understood that the foregoing statement of the objects of the invention and the brief summary thereof is intended to generally explain the same without limiting it in any manner.

Fig. 1 is a side elevational view of a Geiger counter embodying the present invention, portions thereof being cut away to permit a clearer understanding thereof.

Fig. 2 is a perspective view of the handle of said counter and the calibration capsule.

Fig. 3 is an enlarged fragmentary plan view of the portion of said handle containing the slot for the calibration capsule.

Fig. 4 is an enlarged sectional view of a portion of the handle taken through the slot therein showing the calibration capsule situated on detents.

Fig. 5 is an enlarged sectional view of the calibration capsule.

Referring now to the drawing, the preferred radiation-detection calibration means and method there illustrated includes generally a Geiger counter comprising a case or housing 10 consisting of a top wall 11, a bottom wall 12, side walls 13, a front wall 14 and a rear wall 15; there being mounted on and through the top wall 11, a microammeter 16, a range and control knob 17 for a corresponding switch activated thereby (not shown), a covered phone jack 18, a calibration potentiometer 19, and at either end thereof front and rear apertured carrying lugs 20 and 21 to which are affixed metal loops 22 and 23 connected by a carrying strip (not shown). A handle 24, is mounted by a vertically-extending, cleft standard section 25 to housing 10. A stock 26 extends horizontally from section 25 and terminates in an upstanding vertical ear 27 having an aperture 28 therethrough. An important element in the present invention is an oblong slot 29 formed in and through stock 26, the bottom portions of opposing walls thereof bearing inturned preferably confronting detents 30.

A sensor or probe assembly 31 includes a thin-walled Geiger tube 32 mounted within a cylindrical brass barrel 33 having a thin plastic-covered window 34 therein, said barrel being connected, at one end, to a cylindrical cap 35 dimensioned to constitute a friction fit within aperture 28 of ear 27, and at the other end to a screw fitting 36 which constitutes a portion of cable connector 37, which carries the high voltage to Geiger tube 32. Rotatably mounted on barrel 33 is an outside barrel 38 which is apertured to provide a window 39 of approximately the same dimensions as window 34 and positioned to register therewith. A cable 40 extends from connector 37 through a compression fitting 41 on front wall 14 into housing 10.

A lower central portion of front wall 14 extends forwardly to form a projection 42 in which there has been bored a vertical well 43 which acts as a container for a calibration capsule 44, said capsule being readily detachably secured therein by a set screw 45 which is threaded in a horizontally extending threaded bore in communication with well 42.

Capsule 44 (see Fig. 5) comprises a plastic rod having an axial concentric bore in which there has been placed a radioactive agent 46 e. g. a 0.1 cc. solution of radium bromide, hermetically sealed therein by an end plug 47. While radium bromide is used, it is obvious that other radioactive sources may be used depending upon the nature of the radiation sensor and the range of the instrument. In the particular instance of the Geiger counter here described, where the background count normally extends over the range to 30–70 counts per minute, it was necessary to obtain a source which would deliver a sufficiently larger count so that the background range would comprise a relatively small percentage of the total calibration count. Accordingly, a concentration and quantity of radium bromide was provided in capsule 44 which would cause the meter to sense and report approximately 3000 counts per minute. While the statistical error here involved is approximately 3% since the rated accuracy of the meter is 5% the particular radiation source comprises a sufficiently accurate means to calibrate the instrument. Of course, the radioactive source should be selected so that it has a relatively long half life and hence would give a substantially fixed radiation output over a period of years.

Detents 30 extending inwardly along the lower margins of slot 29 in handle 26 may conveniently be made by hammering a ball bearing against the lower margins of said slot. As an example, if the slot were 3/16" wide, then a ball having a 1/4" diameter might be hammered to provide a 1/16" detent.

No attempt has been made to here describe the working of the Geiger counter. Suffice it to say that radiation in the form of beta, gamma, cosmic or X rays causes Geiger tube 32 to report by way of electrical pulse carried through cable the arrival of each particle or photon of radiation, cable 40 leading to the input of electronic stages which shape and amplify said pulses and cause them to be counted, the result of the counting procedures being displayed on microammeter 16 in terms of counts per minute. Means may be incorporated to change the range of the instrument.

Means may also be provided in the probe to vary the degree of shielding of the Geiger tube and hence vary its sensitivity. In probe assembly 31 this is done by making barrel 38 rotatable about barrel 33 so that it is possible to place windows 39 and 34 in registry and thus achieve maximum sensitivity, in which position the instrument will be sensitive to all the radiation enumerated above. If, however, sensitivity to only gamma rays and cosmic radiation is desired, then cylinder 38 may be rotated so that a portion of its solid wall covers window 34 in barrel 33.

To make the calibration check enabled by the present invention, the operator first loosens set screw 45 and removes calibration capsule 44 from well 43. Probe 31 is then removed from handle 24. This is done by pulling the probe (to the left as seen in the drawing) so that cylindrical cap 35 on barrel 33 is removed from aperture 28 in ear 27 of said handle. Calibration capsule 44 is then placed in slot 29 in handle 24. Probe assembly 31 is then reinserted in handle 24 in the position shown in the drawing but is rotated to a predetermined position so that window 39 is covered. The position of said windows may be standardized by providing appropriate guide tabs (not shown) so that the windows may be readily placed in the desired position and so that window 39 may be revolved to a position and radially aligned so as to confront and open upon capsule 44 in slot 29.

If as described above the calibration capsule 44 has been constructed so as to cause a reading of 3000 counts per minute on microammeter 16, then for convenience in calibration a suitable mark may be made on the scale of said meter at the point of said count. The operator selects, by means of range and control knob 17, the range suitable to appropriately displace the 3000 count per minute reading, and if the pointer on the meter does not cover the calibration mark, adjusts potentiometer 19, in one of the gain circuits in the counter, until the pointer is superimposed on the calibration mark. In this fashion compensation may readily be made for such eventualities as the weakening of the batteries, the change in tube characteristics, the aging of circuit components, and the like.

Although the present invention has been described with a certain degree of particularity, it is understood that the present disclosure has been made only by way of example and that numerous variations may be employed without transcending the scope of the invention as hereinafter claimed.

What is claimed is:

1. In a portable radiation measurement device including a housing, a radiation sensor detachably secured to the handle thereof and an evaluation means to measure the output of said sensor, a means of calibrating said device which comprises a radioactive source of radiation mounted within a recess in said handle, mounting means on said handle to secure said sensor in a predetermined position relative said radiation source so as to intercept radiation therefrom and means to vary said evaluation means to produce a predetermined output therefrom.

2. In a portable radiation measurement device including a housing, a radiation sensor movable relative to said housing and an evaluation means to measure the output of said sensor, a means of calibrating said device which comprises a radiation source of radioactive material, first mounting means reproducibly detachably retaining said source to said housing, second mounting means reproducibly detachably retaining said sensor to said housing in a predetermined position relative to said source so as to intercept radiation therefrom and means to vary said evaluation means to produce a predetermined output therefrom.

3. Calibration means as described in claim 2, and third mounting means on said housing remote from said first and second mounting means to detachably store said source when said source is not engaged by said first mounting means.

4. In a portable radiation measurement device including a housing having a handle, a radiation sensor detachable from said housing, and an evaluation means to measure the output of said sensor, a means of calibrating said device which comprises a container carrying radioactive material, first mounting means reproducibly detachably retaining said container to said handle, and second mounting means reproducibly detachably securing said sensor to said handle so as to intercept radiation from said radioactive material and means to vary said evaluation means to produce a predetermined output therefrom.

5. Calibration means as described in claim 4, and third mounting means on said housing remote from said first and second mounting means to detachably store said container when said container is not engaged by said first mounting means.

References Cited in the file of this patent

UNITED STATES PATENTS

| 2,571,439 | Glass | Oct. 16, 1951 |
| 2,601,583 | Ballou | June 24, 1952 |